(No Model.)

F. E. DEGENHARDT.
ELECTRIC CONDUCTOR.

No. 458,316. Patented Aug. 25, 1891.

WITNESSES:
Danvin S. Wolcott
F. E. Gaither.

INVENTOR,
Frederick E. Degenhardt.
by George N. Christy Att'y

United States Patent Office.

FREDERICK E. DEGENHARDT, OF CHICAGO, ILLINOIS, ASSIGNOR TO THE STANDARD UNDERGROUND CABLE COMPANY, OF PITTSBURG, PENNSYLVANIA.

ELECTRIC CONDUCTOR.

SPECIFICATION forming part of Letters Patent No. 458,316, dated August 25, 1891.

Application filed September 1, 1890. Serial No. 363,590. (No model.)

*To all whom it may concern:*

Be it known that I, FREDERICK E. DEGENHARDT, a citizen of the United States, residing at Chicago, in the county of Cook and State of Illinois, have invented or discovered certain new and useful Improvements in Electric Conductors, of which improvements the following is a specification.

The invention described herein relates to certain improvements in the manufacture of electric conductors and cables, and has for its object a construction and arrangement of the protective covering of the conductors and cables, whereby provision is made for the retention of air or gas within the protective covering, thereby decreasing the static capacity of such conductor or cable.

Figure 1:
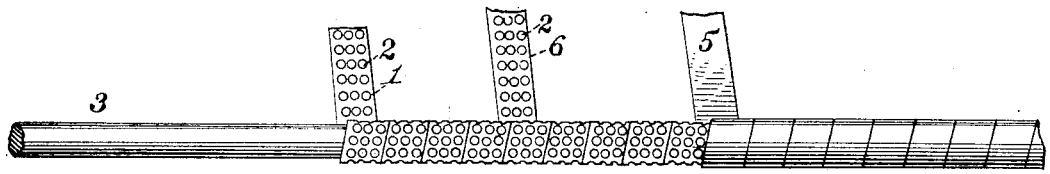
Figure 2:
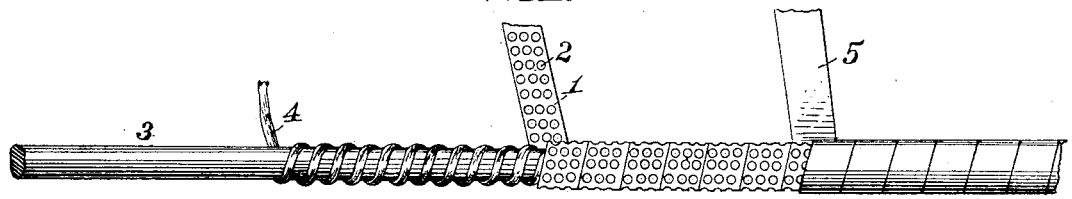
Figure 4:
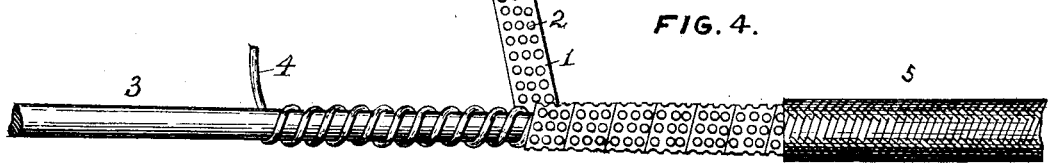
Figure 3:
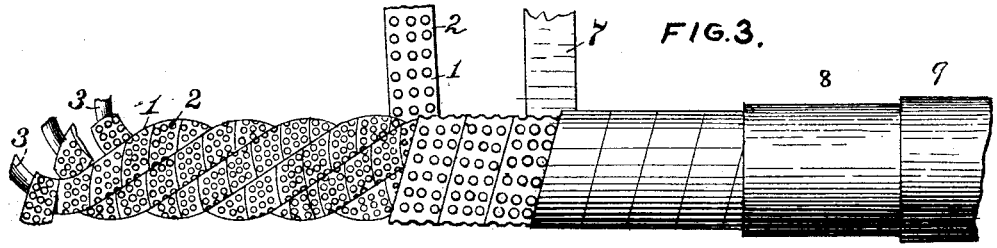

In the accompanying drawings, forming part of this specification, Figure 1 is a view in elevation of a portion of a conductor embodying my invention. Fig. 2 is a similar view of a modified construction. Fig. 3 is a view in elevation of a cable embodying my invention; and Fig. 4 is a view in elevation of my improvement, showing a braided outside covering.

In the practice of my invention I take a strip 1, of paper or other fibrous material, and form therein a large number of perforations 2, and then wrap such perforated strip around the conductor 3, either immediately in contact with the conductor, as shown in Fig. 1, or else outside of a cord 4, of suitable material, wound spirally around or otherwise applied to the conductor. If the strip be comparatively thick when applied directly to the conductor, as shown in Fig. 1, so that the perforations will form comparatively deep pockets, a plain or imperforate strip 5 may be wound on the strip 1, as shown in Fig. 2, wherein the cord 4 holds the perforated strip a sufficient distance from the conductor to effect the retention of a sufficient volume of air. If, however, the strip 1 is comparatively thin, it is the better practice to apply a second or third perforated strip 6 outside of the strip 1, said strip or strips being preferably wound in the opposite direction to the strip 1. It is not necessary that the adjacent edges of the perforated strips should overlap, but may simply abut against each other. Over these perforated strips is wound the imperforate strip 5, whose adjacent edges should preferably overlap, so as to form a tight joint, and over this covering a non-conducting sealing material is applied, so as to prevent access of moisture to the conductor. In lieu of the imperforate strip a closely-laid braid or wrapping may be employed, as shown at 5 in Fig. 4.

In the manufacture of cables each conductor is prepared as above described, except that the imperforate strip 5 may be omitted and then laid up into the form of a cable. The conductors thus laid up may then be wrapped with a perforated strip, which is then covered with an imperforated strip 7, or a braiding or wrapping of fibrous material may be substituted for the imperforate strip 7. Over this imperforate strip or braid is applied a non-conducting sealing material 8, and the cable passed through a lead-press for inclosing it in a lead sheath 9.

I claim herein as my invention—

1. The combination of a conducting-wire and a strip or strips provided with air-filled perforations surrounding the same, substantially as set forth.

2. The combination of a conducting-wire, a cord wound spirally around the wire, and a perforated strip or strips applied over the cord, substantially as set forth.

3. The combination of a conducting-wire, a strip or strips provided with air-filled perforations surrounding the same, and an imperforate covering, substantially as set forth.

4. The combination of a series of two or more conducting-wires, each surrounded by a perforated strip or strips, said conductors being laid up in the form of a cable, and an imperforate covering surrounding such cable, substantially as set forth.

5. The combination of a series of two or more conducting-wires, each surrounded by a perforated strip, said conductors being laid up in the form of a cable, a perforated strip surrounding said cable, and an imperforate covering applied outside of the perforated strip, substantially as set forth.

In testimony whereof I have hereunto set my hand.

FREDERICK E. DEGENHARDT.

Witnesses:
JAS. P. MCQUAIDE,
E. S. PEROT.